US011870158B2

(12) United States Patent
Pan et al.

(10) Patent No.: US 11,870,158 B2
(45) Date of Patent: Jan. 9, 2024

(54) ULTRA-WIDEBAND ANTENNA AND WIRELESS HEADPHONE INCLUDING ULTRA-WIDEBAND ANTENNA

(71) Applicant: PRIMAX ELECTRONICS LTD., Taipei (TW)

(72) Inventors: Yung-Tai Pan, Taipei (TW); Chun-Kai Wang, Taipei (TW); Yih-Shiuan Shin, Taipei (TW); Chi-Chan Lee, Taipei (TW); Yen-Tsung Fu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/809,280

(22) Filed: Jun. 28, 2022

(65) Prior Publication Data

US 2023/0352835 A1 Nov. 2, 2023

(30) Foreign Application Priority Data

Apr. 29, 2022 (TW) .................................. 111116473

(51) Int. Cl.

| | |
|---|---|
| ***H01Q 5/25*** | (2015.01) |
| ***H01Q 1/36*** | (2006.01) |
| ***H01Q 13/10*** | (2006.01) |
| ***H01Q 1/27*** | (2006.01) |
| ***H04R 1/10*** | (2006.01) |

(52) U.S. Cl.

CPC ............... *H01Q 5/25* (2015.01); *H01Q 1/273* (2013.01); *H01Q 1/36* (2013.01); *H01Q 13/10* (2013.01); *H04R 1/1008* (2013.01); *H04R 2420/07* (2013.01)

(58) Field of Classification Search

CPC ............ H01Q 5/25; H01Q 1/273; H01Q 1/36; H01Q 13/10; H04R 2420/07

See application file for complete search history.

(56) References Cited

U.S. PATENT DOCUMENTS

2004/0150570 A1* 8/2004 Yuasa ................. H04M 1/6066 343/702
2005/0266875 A1* 12/2005 Yegin ..................... H01Q 1/273 455/552.1
2007/0080878 A1* 4/2007 McLean ............... H01Q 13/106 343/729
2007/0229360 A1* 10/2007 Yanagi ..................... H01Q 9/40 343/846

(Continued)

*Primary Examiner* — Ab Salam Alkassim, Jr.
*Assistant Examiner* — Anh N Ho
(74) *Attorney, Agent, or Firm* — WPAT, P.C.

(57) ABSTRACT

An ultra-wideband antenna for a wireless headphone is provided, which includes a first portion and a second portion. One side of the first portion has at least two slots. The second portion is laterally adjacent to and separated from the first portion. The second portion includes a main body portion and an extension portion, and one side of the main body portion is close to the at least two slots, and another side of the main body portion is connected to the extension portion, in which an included angle between the main body portion and the extension portion is in a range of between 85 degrees and 135 degrees. A wireless headphone including the above-mentioned ultra-wideband antenna is also provided.

12 Claims, 5 Drawing Sheets

(56) References Cited

U.S. PATENT DOCUMENTS

| | | | | |
|---|---|---|---|---|
| 2009/0128446 | A1* | 5/2009 | Gummalla | H01Q 1/38<br>343/911 R |
| 2009/0195479 | A1* | 8/2009 | Kato | H01Q 1/44<br>381/309 |
| 2010/0315303 | A1* | 12/2010 | Kearney | H01Q 9/42<br>343/848 |
| 2012/0206301 | A1* | 8/2012 | Flores-Cuadras | H01Q 5/357<br>343/700 MS |
| 2017/0359645 | A1* | 12/2017 | Chen | H04R 1/1066 |
| 2023/0168761 | A1* | 6/2023 | Park | H01Q 1/273<br>345/174 |

* cited by examiner

ULTRA-WIDEBAND ANTENNA AND WIRELESS HEADPHONE INCLUDING ULTRA-WIDEBAND ANTENNA

FIELD OF THE INVENTION

The present disclosure relates to an ultra-wideband antenna and a wireless headphone including the ultra-wideband antenna.

BACKGROUND OF THE INVENTION

Frequency bands used by currently available wireless earphones are mostly between 2.4 GHz and 2.5 GHz. However, many electronic products also use the above frequency bands, so the wireless headphone and the electronic products are prone to mutual interference.

SUMMARY OF THE INVENTION

The present disclosure provides an ultra-wideband antenna for a wireless headphone, which includes a first portion and a second portion. One side of the first portion has at least two slots. The second portion is laterally adjacent to and separated from the first portion. The second portion includes a main body portion and an extension portion, and one side of the main body portion is close to the at least two slots, and another side of the main body portion is connected to the extension portion, in which an included angle between the main body portion and the extension portion is in a range of between 85 degrees and 135 degrees.

In some embodiments, the main body portion has a rectangular portion and a hexagonal portion, and a long side of the rectangular portion is close to the at least two slots, and another long side of the rectangular portion is connected to a first base edge of the hexagonal portion, and a second base edge of the hexagonal portion is connected to the extension portion, and the first base edge is substantially parallel to the second base edge, and a length of the first base edge is less than a length of the second base edge.

In some embodiments, a length of the long side of the rectangular portion is greater than the length of the first base edge of the hexagonal portion and smaller than the length of the second base edge of the hexagonal portion.

In some embodiments, a ratio of a length to a width of each of the slots is in a range of between 1.5:1 and 5:1.

In some embodiments, a width of the main body portion is greater than a width of the extension portion.

In some embodiments, the ultra-wideband antenna is arranged in a headband portion of the wireless headphone.

In some embodiments, the first portion is a curved plate.

In some embodiments, the ultra-wideband antenna is suitable for a frequency band in a range of between 6 GHz and 9 GHz.

The present disclosure also provides a wireless headphone, which includes a headband portion, two earmuff portions, the above-mentioned ultra-wideband antenna, a radio frequency module, and a mainboard. The headband portion is connected between the two earmuff portions. The above-mentioned ultra-wideband antenna is arranged in the headband portion. The radio frequency module is arranged in the headband portion and electrically connected to the ultra-wideband antenna. The mainboard is arranged in one of the two earmuff portions, and the radio frequency module is electrically connected to the mainboard.

In some embodiments, the headband portion has a top wall and a side wall connected to the top wall, and the first portion and the main body portion of the second portion are adjacent to the top wall, and the extension portion of the second portion is adjacent to the side wall.

In some embodiments, the wireless headphone further includes a coaxial cable. The ultra-wideband antenna and the radio frequency module are electrically connected through the coaxial cable.

In some embodiments, the ultra-wideband antenna is integrated with the radio frequency module.

In some embodiments, the wireless headphone further includes at least one serial peripheral interface (SPI) circuit. The radio frequency module and the mainboard are electrically connected through the at least one serial peripheral interface circuit.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
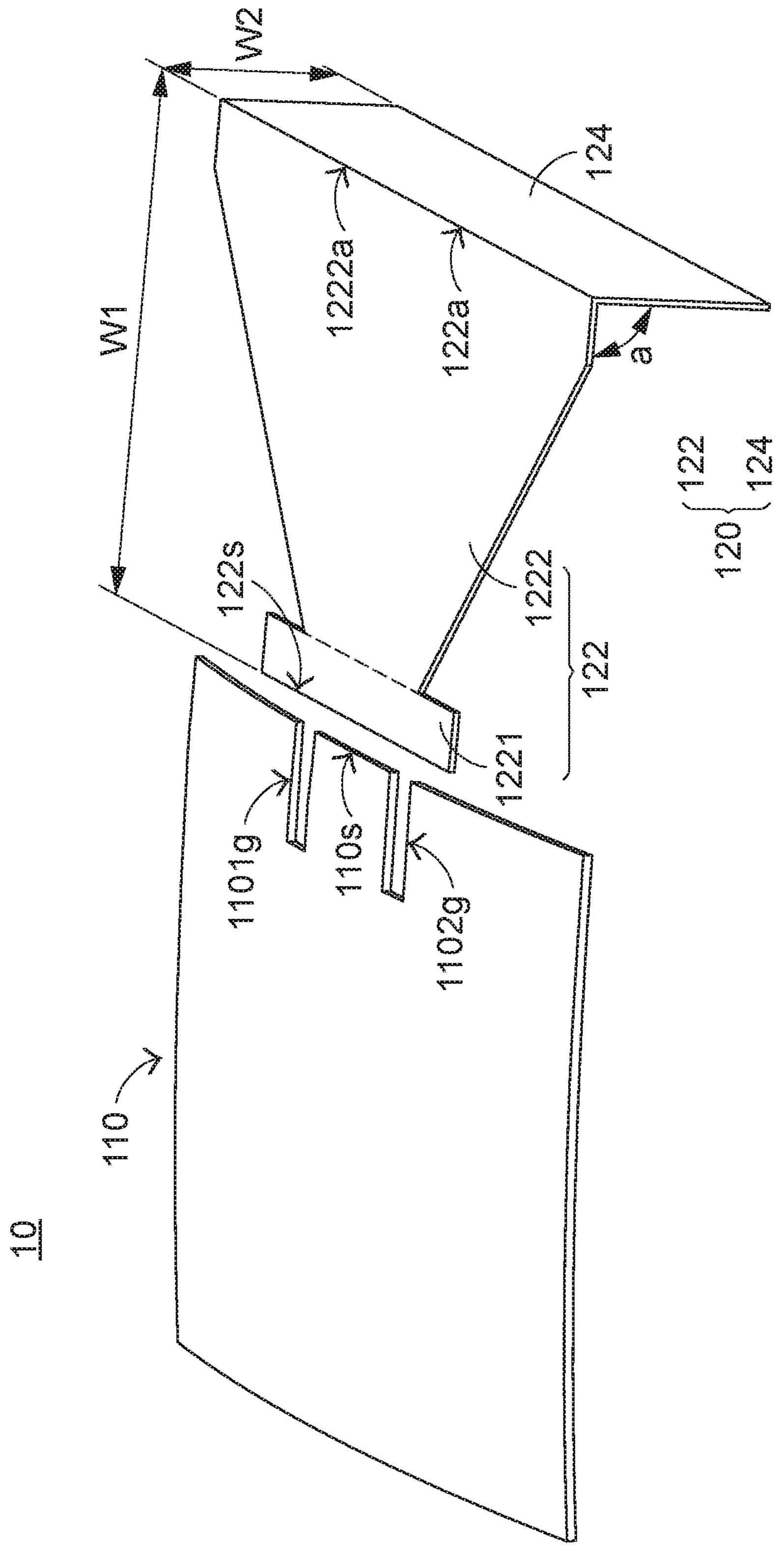
FIG. 1 is a schematic perspective view of an ultra-wideband antenna for a wireless headphone according to an embodiment of the present disclosure.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." The spatially relative descriptions used herein should be interpreted the same.

As mentioned in background of the invention, frequency bands used by currently available wireless earphones are mostly between 2.4 GHz and 2.5 GHz; however, many electronic products also use the above frequency bands, so the wireless headphone and the electronic products are prone to mutual interference. Accordingly, the present disclosure provides an ultra-wideband (UWB) antenna that can be used in a wireless headphone, which is suitable for a frequency band in a range of between 6 GHz and 9 GHz, and thus can solve the issue that the wireless headphone and the electronic products are prone to mutual interference. In addition, since the frequency band used by the ultra-wideband antenna of the present disclosure is relatively high, a transmission amount can be significantly increased. Various embodiments of the ultra-wideband antenna of the present disclosure will be described in detail below.

Figure 2:
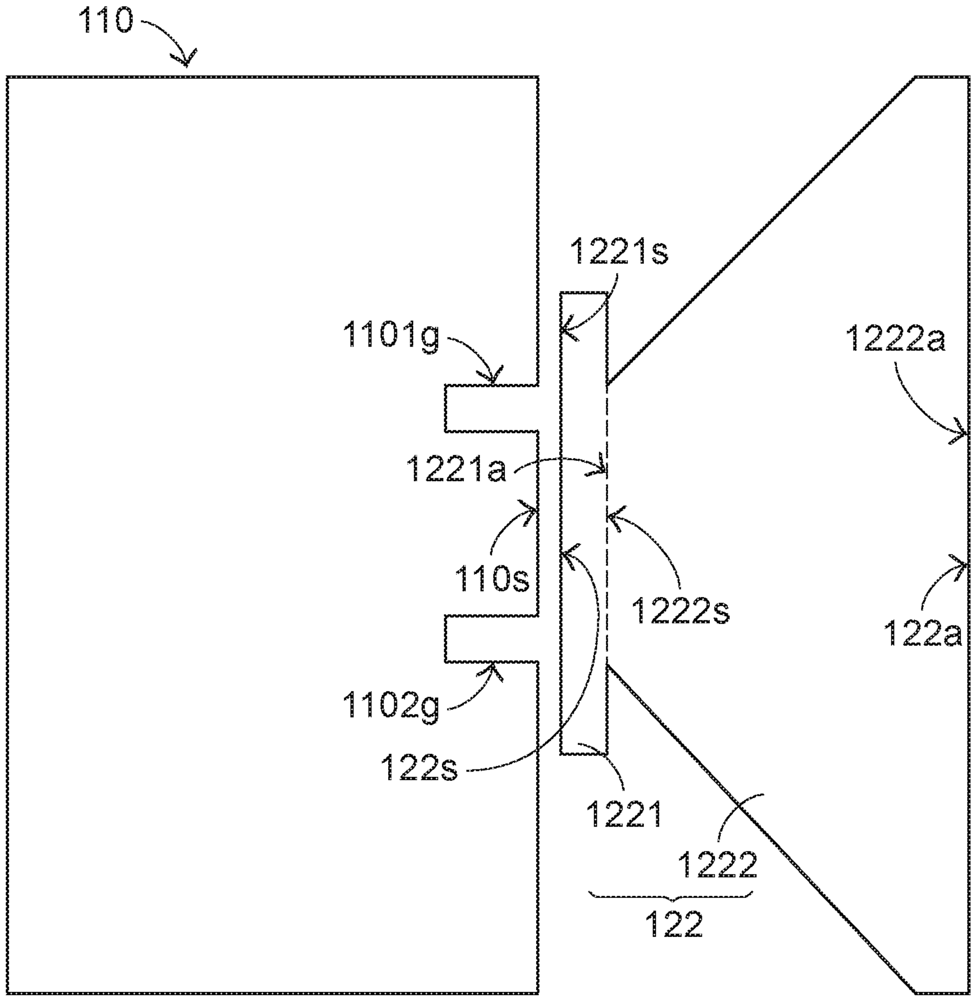
FIG. 2 is a schematic top view of an ultra-wideband antenna for a wireless headphone according to an embodiment of the present disclosure.

FIG. 1 is a schematic perspective view of an ultra-wideband antenna for a wireless headphone according to an embodiment of the present disclosure. FIG. 2 is a schematic top view of an ultra-wideband antenna for a wireless headphone according to an embodiment of the present disclosure. As shown in FIGS. 1 and 2, the ultra-wideband antenna 10 includes a first portion 110 and a second portion 120.

One side 110*s* of the first portion 110 has at least two slots 1101*g*, 1102*g*, and the two slots 1101*g*, 1102*g* are separated by a distance. In some embodiments, each of the slots 1101*g*, 1102*g* is rectangular and has a ratio of a length to a width in a range of between 1.5:1 and 5:1. In some embodiments, a length of each of the slots 1101*g*, 1102*g* is in a range of between 1.0 mm and 2.5 mm, such as 1.0 mm, 1.5 mm, 2.0 mm, 2.5 mm, or any value between any two values. In some embodiments, a width of each of the slots 1101*g*, 1102*g* is in a range of between 0.5 mm and 1.5 mm, such as 0.5 mm, 1.0 mm, 1.5 mm, or any value between any two values. However, the present disclosure is not limited to the foregoing embodiments, and the number, position, shape of the slots and a distance between the slots can be appropriately adjusted according to actual needs.

The second portion 120 is laterally adjacent to the first portion 110, and the second portion 120 and the first portion 110 are separated from each other. The second portion 120 includes a main body portion 122 and an extension portion 124. One side 122*s* of the main body portion 122 is close to the at least two slots 1101*g* and 1102*g*, and another side 122*a* of the main body portion 122 is connected to the extension portion 124. In some embodiments, a space between the side 110*s* between the two slots 1101*g* and 1102*g* of the first portion 110 and the side 122*s* of the second portion 120 is a feed point of the ultra-wideband antenna.

As shown in FIG. 1, an included angle a between the main body portion 122 and the extension portion 124 is in a range of between 85 degrees and 135 degrees, such as 85 degrees, 90 degrees, 95 degrees, 100 degrees, 105 degrees, 110 degrees, 115 degrees, 120 degrees, 125 degrees, 130 degrees, 135 degrees, or any angle between any two values. In some embodiments, the included angle a between the main body portion 122 and the extension portion 124 is in a range of between 90 degrees and 105 degrees. In some embodiments, a width W1 of the main body portion 122 is greater than a width W2 of the extension portion 124.

In some embodiments, the main body portion 122 has a rectangular portion 1221 and a polygonal portion. A polygonal portion of FIGS. 1 and 2 is exemplified by a hexagonal portion 1222, but the present disclosure is not limited thereto. In other embodiments, the polygonal portion may be a trapezoid, a rectangle, a pentagon or other suitable shapes. As shown in FIGS. 1 and 2, a long side 1221*s* of the rectangular portion 1221 is close to the at least two slots 1101*g* and 1102*g*, and another long side 1221*a* of the rectangular portion 1221 is connected to a first base edge 1222*s* of the hexagonal portion 1222. A second base edge 1222*a* of the hexagonal portion 1222 is connected to the extension portion 124. In some embodiments, the first base edge 1222*s* is substantially parallel to the second base edge 1222*a*, and a length of the first base edge 1222*s* is less than a length of the second base edge 1222*a*. In some embodiments, a length of the long side 1221*s* of the rectangular portion 1221 and a length of the other long side 1221*a* are greater than a length of the first base edge 1222*s* of the hexagonal portion 1222 and less than a length of the second base edge 1222*a* of the hexagonal portion 1222.

In some embodiments, the ultra-wideband antenna 10 is arranged in a headband portion of the wireless headphone. In particular, the inventors found that, compared to arranging the ultra-wideband antenna 10 in an earmuff portion of the wireless headphone, arranging the ultra-wideband antenna 10 in the headband portion of the wireless headphone can significantly increase a maximum transmission distance between the ultra-wideband antenna 10 and a dongle installed on a computer (e.g., a laptop) during pairing, and whether the headphone is facing the computer, or the headphone is rotated 90 degrees, 180 degrees, or 270 degrees clockwise, the maximum transmission distance during pairing is significantly improved. In some embodiments, the ultra-wideband antenna 10 is arranged in the headband portion of the wireless headphone, and the maximum transmission distance between the ultra-wideband antenna 10 and the dongle during pairing is in a range of between about 7.9 meters and about 13.5 meters. However, the present disclosure is not limited to the foregoing embodiments, and it is also feasible that the ultra-wideband antenna 10 is arranged in the earmuff portion of the wireless headphone, which also has a certain maximum transmission distance.

In some embodiments, as shown in FIG. 1, the first portion 110 is a curved plate, and two short sides of the first portion 110 are slightly bent downward to match a shape of a housing of the headband portion. However, the present disclosure is not limited to the foregoing embodiments, and in other embodiments, the first portion 110 may be a flat plate. In some embodiments, the main body portion 122 of the second portion 120 may be a curved plate or a flat plate.

Figure 3:
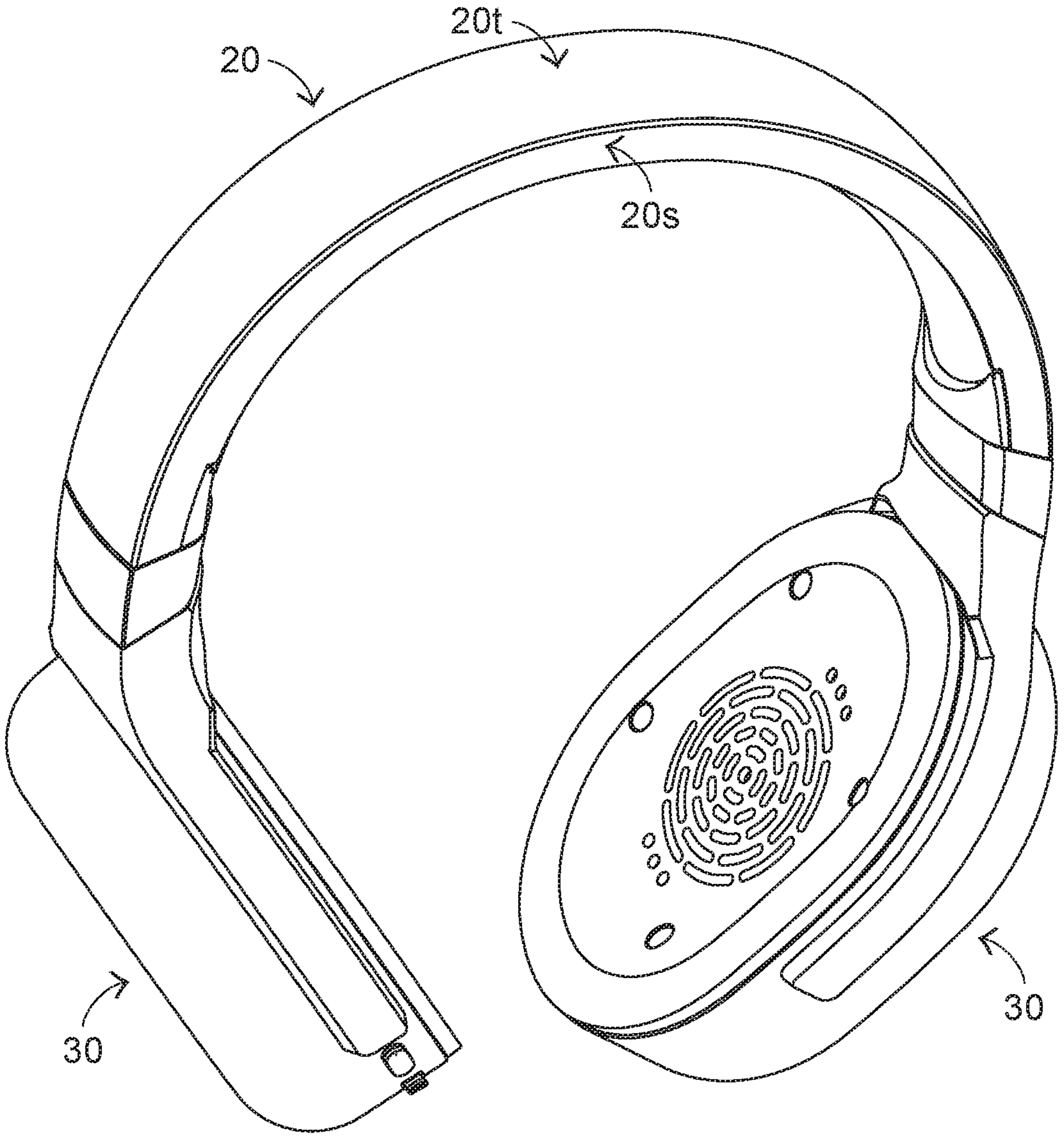
FIG. 3 is a schematic perspective view of a wireless headphone according to an embodiment of the present disclosure.
Figure 4:
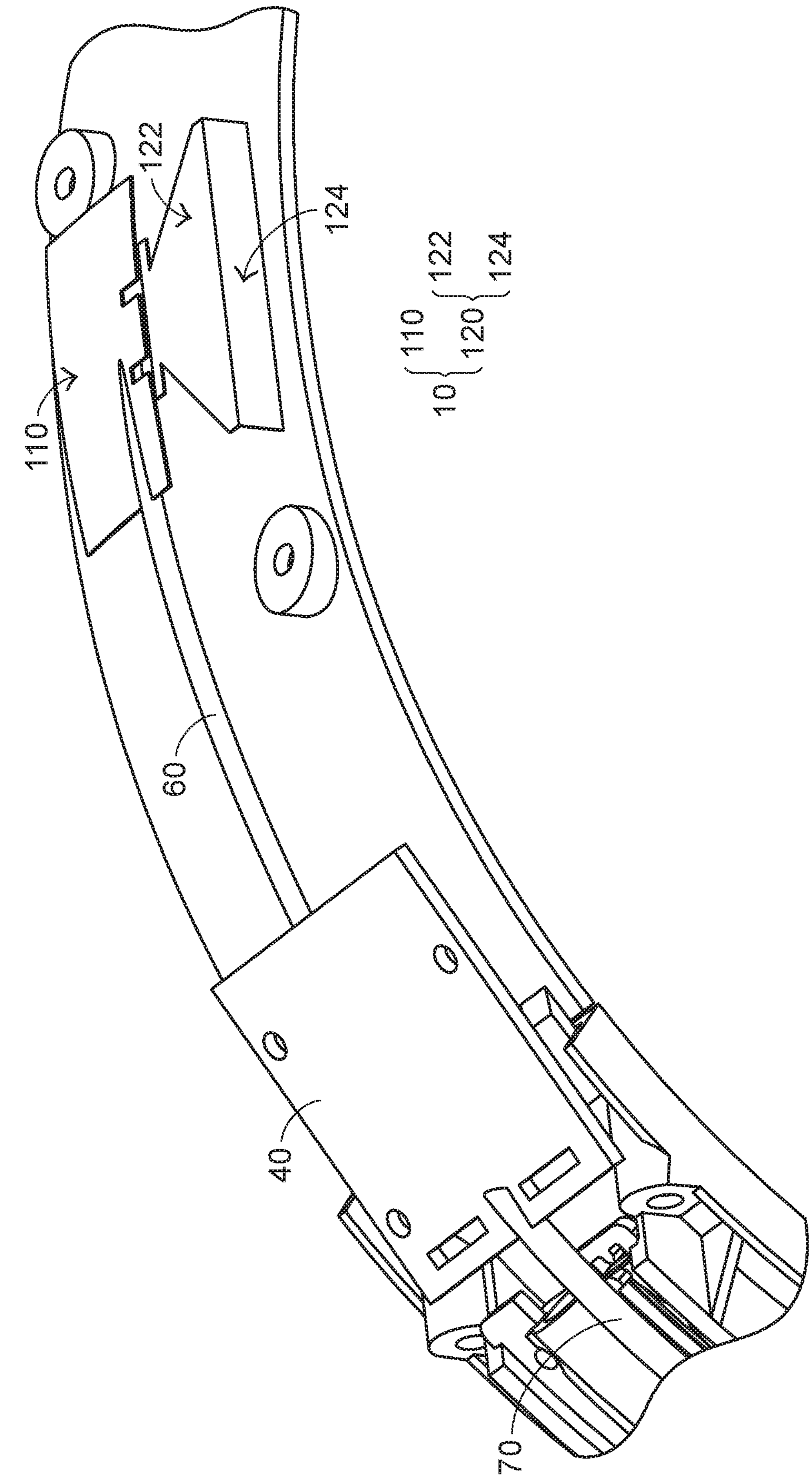
FIG. 4 is a schematic perspective view of a portion of a wireless headphone according to an embodiment of the present disclosure.
Figure 5:
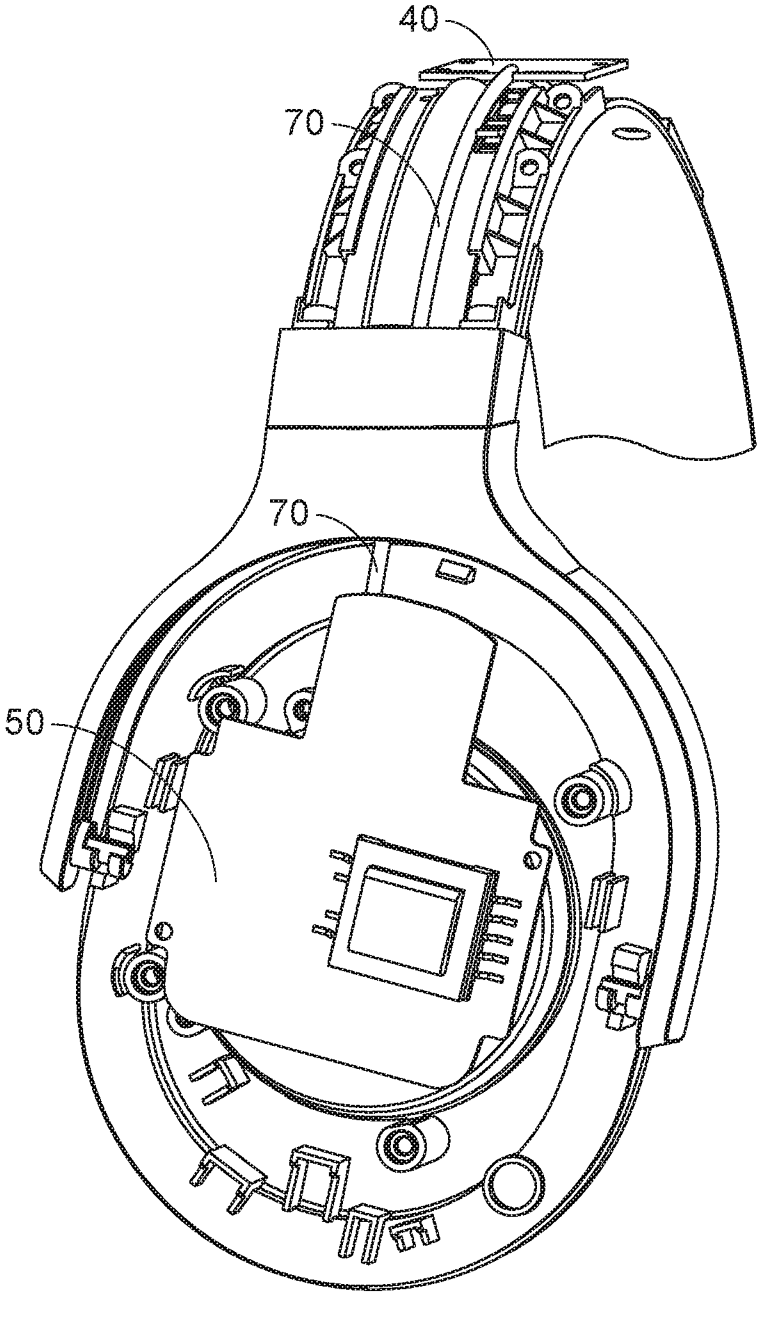
FIG. 5 is a schematic perspective view of a portion of a wireless headphone according to an embodiment of the present disclosure.

The present disclosure also provides a wireless headphone. FIG. 3 is a schematic perspective view of a wireless headphone according to an embodiment of the present disclosure. FIG. 4 is a schematic perspective view of a portion of a wireless headphone according to an embodiment of the present disclosure. FIG. 5 is a schematic perspective view of a portion of a wireless headphone according to an embodiment of the present disclosure. As shown in FIGS. 3, 4 and 5, the wireless headphone includes a headband portion 20, two earmuff portions 30, the aforementioned ultra-wideband antenna 10, a radio frequency module 40 and a mainboard 50. As shown in FIG. 3, the headband portion 20 is connected between the two earmuff portions 30.

As shown in FIGS. 3 and 4, the ultra-wideband antenna 10 is arranged in the headband portion 20. In some embodiments, as shown in FIG. 3, the headband portion 20 has a top wall 20*t* and a side wall 20*s* connected to the top wall 20*t*, and the first portion 110 and the main body portions 122 of and the second portion 120 are adjacent to the top wall 20*t*, and the extension portion 124 of the second portion 120 is adjacent to the side wall 20*s*. In some embodiments, the first portion 110 and the main body portions 122 of the second portion 120 are adhered to the top wall 20*t* through adhesive, and the extension portion 124 of the second portion 120 is adhered to the side wall 20*s* through adhesive.

As shown in FIGS. 3 and 4, the radio frequency module 40 is arranged in the headband portion 20 and is electrically connected to the ultra-wideband antenna 10. In some embodiments, as shown in FIG. 4, the wireless headphone further includes a coaxial cable 60, and the ultra-wideband antenna 10 and the radio frequency module 40 are electrically connected through the coaxial cable 60. However, the present disclosure is not limited to the foregoing embodiments, and another suitable electrical connection element can also be used to replace the coaxial cable 60.

It is worth noting that, compared to respectively arranging the ultra-wideband antenna and the radio frequency module in the headband portion and the earmuff portion, in some embodiments of the present disclosure, both the ultra-wideband antenna 10 and the radio frequency module 40 are arranged in the headband portion 20, a length of the coaxial cable 60 can be greatly shortened, and thus signal loss generated by the coaxial cable 60 during signal transmission can be significantly reduced, so that signal transmission efficiency of the ultra-wideband antenna 10 is much better. However, the present disclosure is not limited to the foregoing embodiments, and in other embodiments, the ultra-wideband antenna and the radio frequency module can be integrated together, so no coaxial cable is required. In other embodiments, the ultra-wideband antenna is disposed on a front side, a back side, or both the front side and the back side of the substrate of the radio frequency module.

As shown in FIG. 3 and FIG. 5, the mainboard 50 is arranged in one of the two earmuff portions 30, and the radio frequency module 40 is electrically connected to the mainboard 50. In some embodiments, the wireless headphone further includes at least one serial peripheral interface (SPI) circuit 70, and the radio frequency module 40 and the mainboard 50 are electrically connected through the at least one serial peripheral interface circuit 70. The number of serial peripheral interface circuit 70 can be appropriately adjusted according to actual needs. However, the present disclosure is not limited to the foregoing embodiments, and another suitable electrical connection element can also be used to replace the serial peripheral interface circuit 70.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. An ultra-wideband (UWB) antenna for a wireless headphone with a headband portion, comprising:

a first portion, one side of the first portion having at least two slots; and a second portion, laterally adjacent to and separated from the first portion, and the second portion including a main body portion and an extension portion, and one side of the main body portion being close to the at least two slots, and another side of the main body portion being connected to the extension portion, wherein an included angle between the main body portion and the extension portion is in a range of between 85 degrees and 135 degrees;

wherein the headband portion has a top wall and a side wall connected to the top wall, and the first portion and the main body portion of the second portion are adjacent to the top wall, and the extension portion of the second portion is adjacent to the side wall.

2. The ultra-wideband antenna of claim 1, wherein the main body portion has a rectangular portion and a hexagonal portion, and a long side of the rectangular portion is close to the at least two slots, and another long side of the rectangular portion is connected to a first base edge of the hexagonal portion, and a second base edge of the hexagonal portion is connected to the extension portion, and the first base edge is substantially parallel to the second base edge, and a length of the first base edge is less than a length of the second base edge.

3. The ultra-wideband antenna of claim 2, wherein a length of the long side of the rectangular portion is greater than the length of the first base edge of the hexagonal portion and smaller than the length of the second base edge of the hexagonal portion.

4. The ultra-wideband antenna of claim 1, wherein a ratio of a length to a width of each of the slots is in a range of between 1.5:1 and 5:1.

5. The ultra-wideband antenna of claim 1, wherein a width of the main body portion is greater than a width of the extension portion.

6. The ultra-wideband antenna of claim 1, wherein the ultra-wideband antenna is arranged in a headband portion of the wireless headphone.

7. The ultra-wideband antenna of claim 1, wherein the first portion is a curved plate.

8. The ultra-wideband antenna of claim 1, wherein the ultra-wideband antenna is suitable for a frequency band in a range of between 6 GHz and 9 GHz.

9. A wireless headphone comprising:

a headband portion;

two earmuff portions, and the headband portion being connected between the two earmuff portions;

an ultra-wideband antenna, arranged in the headband portion, wherein the ultra-wideband antenna comprises a first portion and a second portion, and the second portion is laterally adjacent to and separated from the first portion;

a radio frequency module, arranged in the headband portion and electrically connected to the ultra-wideband antenna; and a mainboard, arranged in one of the two earmuff portions, and the radio frequency module being electrically connected to the mainboard;

wherein one side of the first portion has at least two slots, the second portion includes a main body portion and an extension portion, one side of the main body portion is close to the at least two slots, another side of the main body portion is connected to the extension portion, and an included angle between the main body portion and the extension portion is in a range of between 85 degrees and 135 degrees; and wherein the headband portion has a top wall and a side wall connected to the top wall, and the first portion and the main body portion of the second portion are adjacent to the top wall, and the extension portion of the second portion is adjacent to the side wall.

10. The wireless headphone of claim 9, further comprising:

a coaxial cable, the ultra-wideband antenna and the radio frequency module being electrically connected through the coaxial cable.

11. The wireless headphone of claim 9, wherein the ultra-wideband antenna is integrated with the radio frequency module.

12. The ultra-wideband antenna of claim 9, further comprising:

at least one serial peripheral interface (SPI) circuit, the radio frequency module and the mainboard being electrically connected through the at least one serial peripheral interface circuit.

* * * * *